US010393924B2

(12) United States Patent
Chen et al.

(10) Patent No.: US 10,393,924 B2
(45) Date of Patent: Aug. 27, 2019

(54) POLARIZER AND DISPLAY DEVICE

(71) Applicant: AU OPTRONICS CORPORATION, Hsin-chu (TW)

(72) Inventors: Chien-Chi Chen, Hsin-chu (TW); Yu-Han Chiang, Hsin-chu (TW); Shang-Chiang Lin, Hsin-chu (TW); Chen-Hsien Liao, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/691,075

(22) Filed: Aug. 30, 2017

(65) Prior Publication Data

US 2018/0067233 A1 Mar. 8, 2018

(30) Foreign Application Priority Data

Sep. 2, 2016 (TW) ............................... 10512822 A

(51) Int. Cl.

| | |
|---|---|
| ***G02B 1/11*** | (2015.01) |
| ***G02B 5/30*** | (2006.01) |
| ***G02F 1/1335*** | (2006.01) |
| ***G02B 5/02*** | (2006.01) |
| *G02B 1/14* | (2015.01) |

(52) U.S. Cl.

CPC .............. *G02B 1/11* (2013.01); *G02B 5/0242* (2013.01); *G02B 5/3025* (2013.01); *G02B 5/3041* (2013.01); *G02F 1/133528* (2013.01); *G02B 1/14* (2015.01); *G02F 1/133504* (2013.01); *G02F 2201/50* (2013.01)

(58) Field of Classification Search

CPC ...... G02B 1/11; G02B 5/3025; G02B 5/0242; G02B 5/3041; G02B 1/14; G02F 1/133528; G02F 1/133504; G02F 2201/50

See application file for complete search history.

(56) References Cited

U.S. PATENT DOCUMENTS 5,706,134 A * 1/1998 Konno ................. G02B 5/0226 359/452
2010/0097705 A1* 4/2010 Furui ................. B29D 11/0073 359/599
2012/0094012 A1* 4/2012 Yokoyama ............... B05D 5/02 427/8

FOREIGN PATENT DOCUMENTS

| | | |
|---|---|---|
| CN | 1565842 A | 1/2005 |
| CN | 101630032 A | 1/2010 |
| CN | 103026271 A | 4/2013 |
| TW | 201222081 A | 6/2012 |
| TW | 201248255 A | 12/2012 |

OTHER PUBLICATIONS

Translation of TW 201222081. Jun. 2012.*

(Continued)

*Primary Examiner* — Phu Vu

(74) *Attorney, Agent, or Firm* — Tim Tingkang Xia, Esq.; Locke Lord LLP

(57) ABSTRACT

A polarizer includes an adhesive, a first protective layer, a substrate layer, a second protective layer and a surface protective film. The surface protective film includes a plurality of first particles. Each of the first particles has a first particle size. The first particle size is greater than or equal to 10 μm.

8 Claims, 6 Drawing Sheets

(56) References Cited

OTHER PUBLICATIONS

Office Action issued by (TIPO) Intellectual Property Office, Ministry of Economic Affairs, R. O. C. dated Nov. 22, 2016 for Application No. 105128322, Taiwan.
Office Action issued by the State Intellectual Property Office of the Peoples Republic of China dated Oct. 29, 2018 for Application No. CN201610935890.4.

* cited by examiner

POLARIZER AND DISPLAY DEVICE

CROSS-REFERENCE TO RELATED PATENT APPLICATION

This application claims priority to and the benefit of, pursuant to 35 U.S.C. § 119(a), Patent Application No. 105128322 filed in Taiwan on Sep. 2, 2016. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to a polarizer, and in particular, to a polarizer capable of reducing the gloss at various angles of view, and a display device including the polarizer.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A polarizer may polarize light to produce polarized light parallel to the optical axis of the polarizer. In today's display technology, the polarizer is still one of indispensable components of most displays. Taking a liquid crystal display device as an example, when the polarizer is applied to the liquid crystal display, the liquid crystal display device can utilize the polarized light, and liquid crystal molecules twist to control light pass through or not.

A display device may be inevitably irradiated by ambient light during use, and therefore a polarizer disposed at the outermost side of the display device reduces the gloss by using a surface treatment method, so as to inhibit glare caused by irradiation of the ambient light on the display device. However, the surface treatment in the market (for example, AGS1, AG150, or moth-eye structure manufactured by Nitto Denko) reduces the anti-glare capability along with increasing the incident angle of the ambient light, and thus the gloss also increases accordingly. In particular, the gloss of a display device may increase significantly at a relatively large incident angle (for example, approximately 85° to approximately 90°), resulting in differences in the brightness observed by a user at different view angles, thereby influencing a visual quality of the user in viewing the display device.

SUMMARY

The present disclosure is directed to a polarizer. A surface of the polarizer has particles, and particle sizes of the particles are substantially equal to or greater than 10 micrometer (μm). Particles of the polarizer reduce a specular reflection of ambient light on the surface of the polarizer and reduce the gloss at various view angles. A display device includes the polarizer also being provided.

An embodiment of the present disclosure provides a polarizer, including an adhesive, a first protective layer, a substrate layer, a second protective layer, and a surface protective film. The first protective layer is disposed on the adhesive, the substrate layer is disposed on the first protective layer, the second protective layer is disposed on the substrate layer, and the surface protective film is disposed on the second protective layer, where the surface protective film includes a plurality of first particles, and each of the first particles has a first particle size, the first particle size being substantially equal to or greater than 10 micrometer (μm).

Another embodiment of the present disclosure provides a display device, including a first substrate, a second substrate, a display medium layer, and an upper polarizer. The first substrate has a plurality of sub-pixels, each of sub-pixels having at least one active component, at least one pixel electrode, and at least one signal line, the pixel electrode being electrically connected to the active component and the signal line. The second substrate is disposed opposite to the first substrate; the display medium layer is disposed between the first substrate and the second substrate; and the upper polarizer sheet is disposed on the second substrate, where the upper polarizer sheet includes a structure of a polarizer as stated above.

The surface protective film of the polarizer of the present disclosure includes first particles, and therefore has an effect of reducing the gloss regardless of degrees of the incident angle of the ambient light, so that brightness of ambient reflective light observed by a user at various view angles is reduced, thereby further improving the visual quality of the user in viewing.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
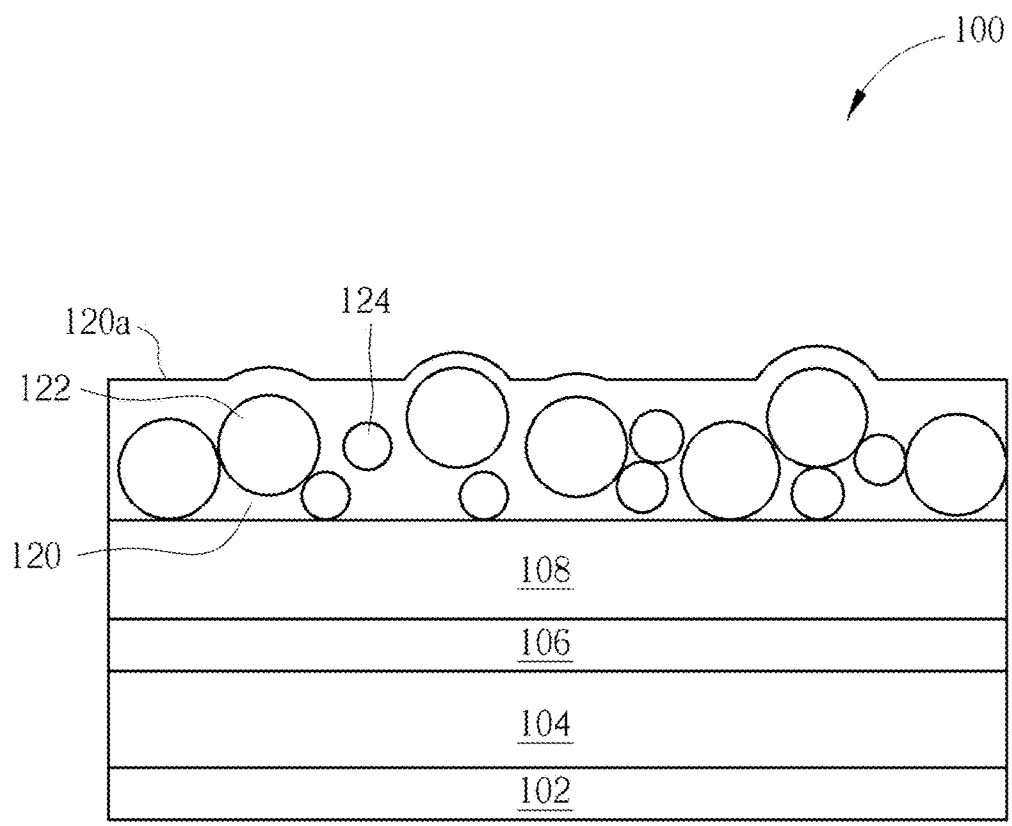
FIG. 1 is a schematic cross-sectional view of a polarizer according to an embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "having", "containing", "involving", and the like are to be understood to be open-ended, i.e., to mean including but not limited to.

The disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present. As used herein, "connected" may refer to a physical and/or electrical connection.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

The present disclosure is more particularly described in the following examples that are intended as illustrative only since numerous modifications and variations therein will be apparent to those skilled in the art. Various embodiments of the disclosure are now described in detail.

Referring to FIG. 1, FIG. 1 is a schematic cross-sectional view of a polarizer according to an embodiment of the present disclosure. As shown in FIG. 1, a polarizer 100 of this embodiment includes an adhesive 102, a first protective layer 104, a substrate layer 106, a second protective layer 108, and a surface protective film 120. The following describes structures of the components and relative arrangement relationships thereof. The polarizer 100 is adhered to a display device or other product requiring the polarizer 100 by means of an adhesive 102. That is, the adhesive 102 serves as the bottommost layer of the polarizer 100. The adhesive 102 may be, for example, a viscose which produces an adhesive characteristic when pressure is applied thereto. The material of adhesive 102 may be, for example, such as pressure sensitive adhesive, thermosetting adhesive, for example polyethylene vinylacetate (EVA), acrylic polymer, silicon polymers, polyester, polyurethane, polyamide, polyether, fluorine or rubber polymers, transparent polymers, or other suitable materials. The first protective layer 104 is disposed on the adhesive 102. In this embodiment, the first protective layer 104 may have an optical compensation property, so as to eliminate light leakage phenomenon at a large view angle, but the present disclosure is not limited thereto. The first protective layer 104 has a function of supporting and protecting the polarizer 100. The substrate layer 106 is disposed on the first protective layer 104, to polarize light that passes through the substrate layer 106, and is provided with a polarizing mechanism. The second protective layer 108 is disposed on the substrate layer 106. The substrate layer 106 is disposed between the first protective layer 104 and the second protective layer 108, and therefore, the substrate layer 106 may be protected by means of the first protective layer 104 and the second protective layer 108, to reduce brittle fracture, shrinkage and block influences of water vapor. The surface protective film 120 is disposed on the second protective layer 108, to serve as the outermost layer structure of the polarizer 100. Specifically, the surface protective film 120 has an upper surface **120*a* and the upper surface 120*a* of the surface protective film 120 is a surface of the polarizer 100 of this embodiment. In addition, in this embodiment, the material of the first protective layer 104 may include organic resins such as triacetate cellulose film (TAC) or cyclo-olefin polymer (COP), the material of the substrate layer 106 may include polyvinyl alcohol (PVA), and the material of the second protective layer 108 and the surface protective film 120 may include organic resins such as triacetate fiber, polyester film (PET), or poly acrylate, but the present disclosure is not limited thereto. The materials of the first protective layer 104, the second protective layer 108, and the surface protective film 120** may be selected from substantially the same or different materials.

The surface protective film 120 includes a plurality of first particles 122. Specifically, the first particles 122 protrude on the upper surface **120*a* of the surface protective film 120, so that the upper surface 120*a* of the surface protective film 120 is rough, thereby enhancing the haze of the surface protective film 120 and reducing the gloss. It should be noted that, in the present disclosure, the haze is defined as “a ratio of the intensity of the scattered light to the intensity of the total outgoing light” in units of percentage (%), the gloss is defined as “a capability of an object for producing reflective light with respect to ambient light of an incident angle”, for example, the capability of producing reflective light with an angle of about 80° when the incident angle of the ambient light is about 80°, where the unit is gloss unit (GU). Visible light is used as an example for the light or the ambient light. In detail, each of the first particles 122 has a first particle size, and the first particle size is substantially equal to or greater than 10 μm. In this embodiment, the first particle sizes of all first particles 122 may be different. For example, the first particle size of each first particle 122 in the surface protective film 120 is in a range between approximately 10 μm and approximately 15 μm, but the present disclosure is not limited thereto, and in a variant embodiment, the first particle sizes of all the first particles 122 may be substantially the same. In addition, in this embodiment, the material of the first particles 122 may include silicon, silicon dioxide, poly acrylate, or other suitable materials, and the refractive index of the first particles 122 is in a range between approximately 1.49 and approximately 1.59 (with no unit). That is, the refractive index of the first particles 122 is close to the refractive index of glass, to reduce refractive light of image displaying between a glass substrate of the display device and the first particles 122**.

Figure 2:
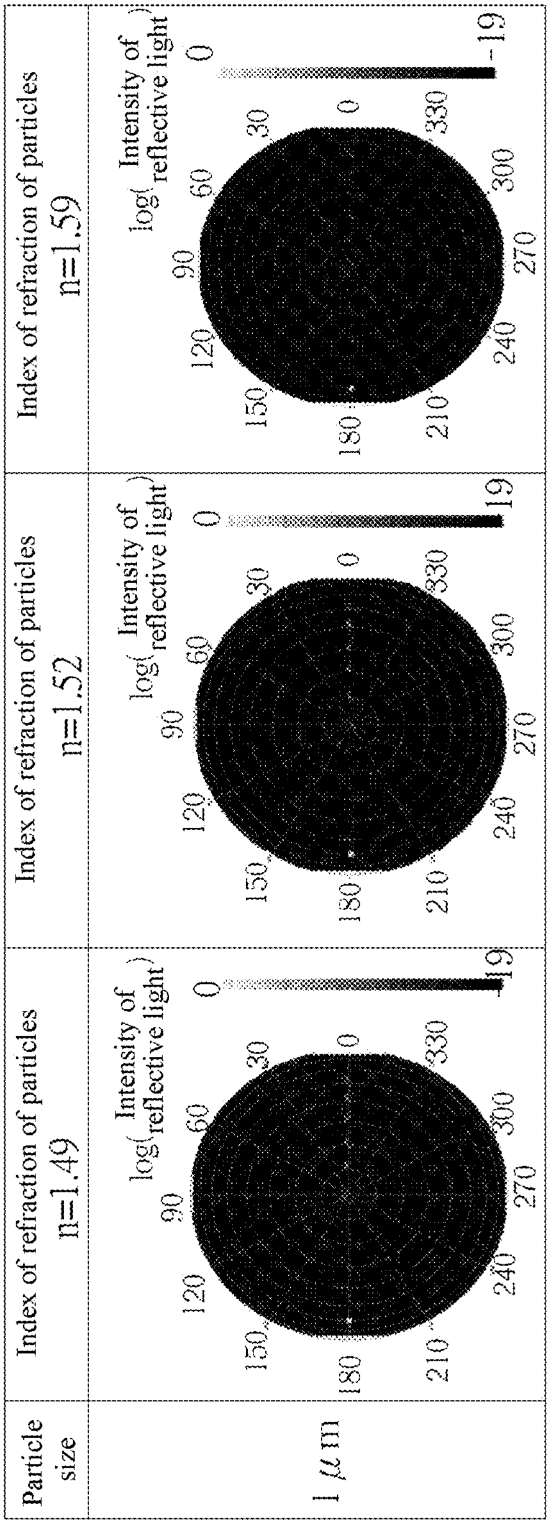
FIG. 2 is a simulated diagram of a bidirectional reflectance distribution function (BRDF) of reflective light on a surface protective film having a plurality of particles with a particle size of 1 μm when an incident angle of incident light is stimulated to be 60° by using a finite-difference time-domain (FDTD) method.
Figure 3:
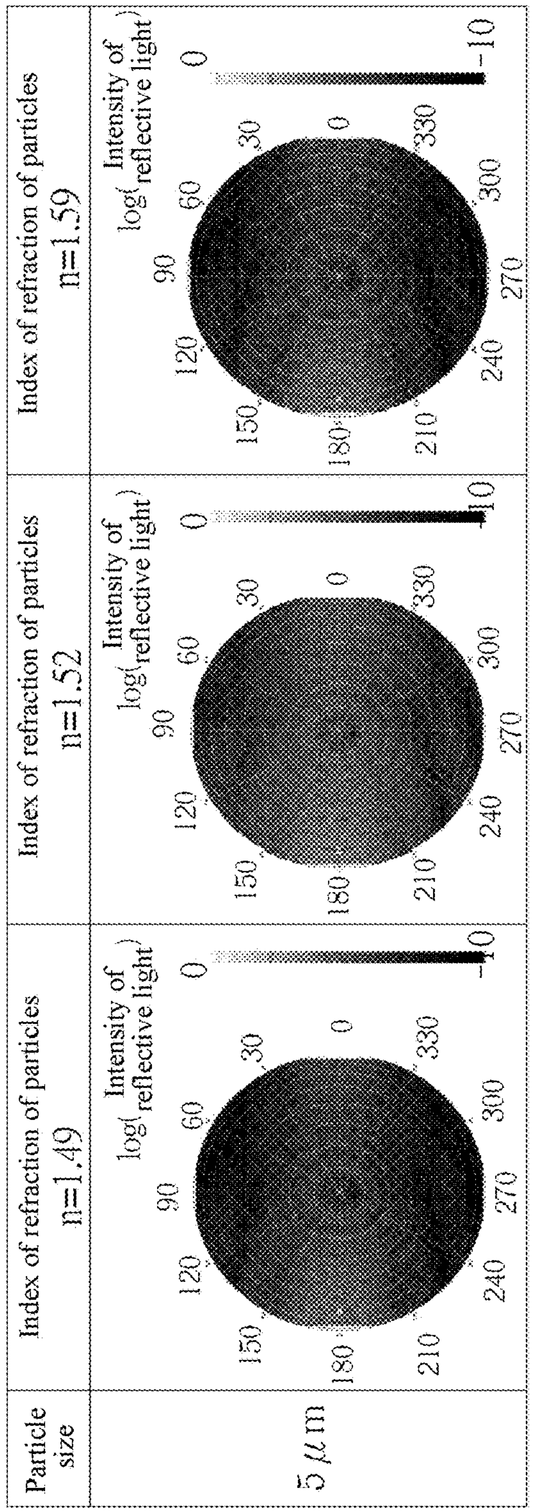
FIG. 3 is a simulated diagram of a BRDF of reflective light on a surface protective film having a plurality of particles with a particle size of 5 μm when an incident angle of incident light is stimulated to be 60° by using a FDTD method.
Figure 4:
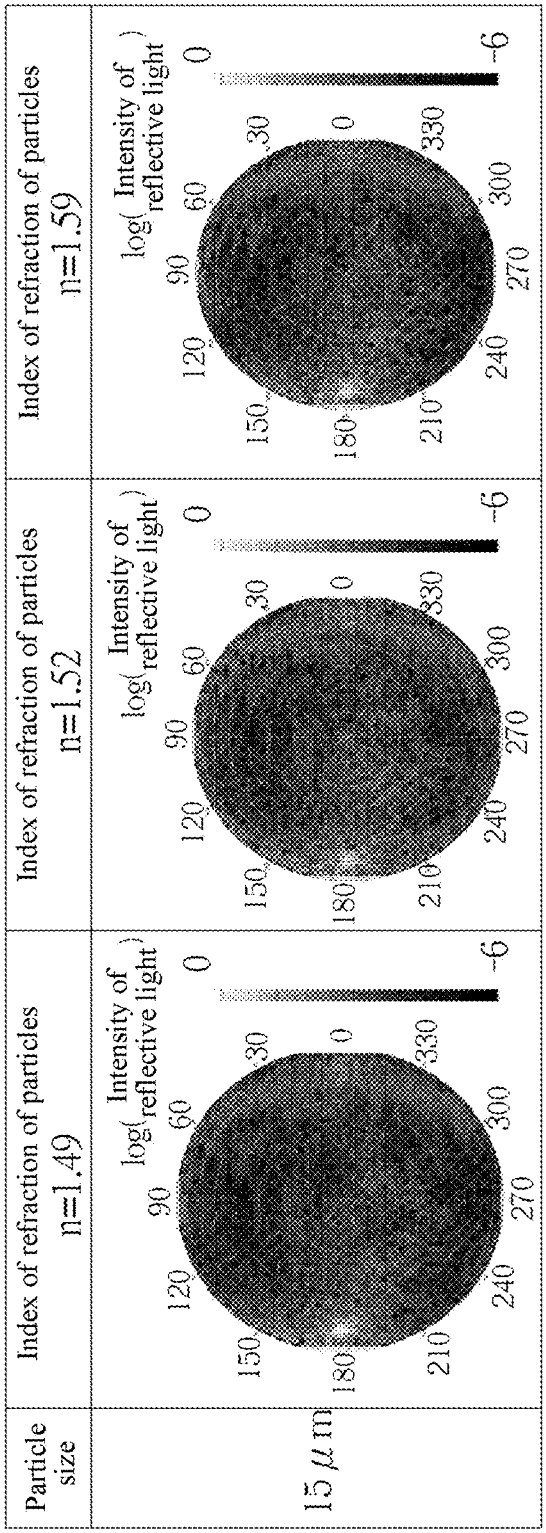
FIG. 4 is a simulated diagram of a BRDF of reflective light on a surface protective film having a plurality of particles with a particle size of 15 μm when an incident angle of incident light is stimulated to be 60° by using a FDTD method.

Referring to FIG. 2 to FIG. 4, FIG. 2 is a simulated diagram of a bidirectional reflectance distribution function (BRDF) of reflective light on a surface protective film having a plurality of particles with a particle size of 1 μm when an incident angle of incident light is stimulated to be about 60° by using a finite-difference time-domain (FDTD) method, FIG. 3 is a simulated diagram of a BRDF of reflective light on a surface protective film having a plurality of particles with a particle size of about 5 μm when an incident angle of incident light is stimulated to be about 60° by using a FDTD method, FIG. 4 is a simulated diagram of a BRDF of reflective light on a surface protective film having a plurality of particles with a particle size of about 15 μm when an incident angle of incident light is stimulated to be about 60° by using a FDTD method. The incident angle of the incident light is defined as an included angle between an advancing direction of the incident light and a normal of the surface protective film, and the center-to-circumference is expressed as the angle of view from about 0° to about 90°. The visible light is relatively bright when log(intensity of reflective light)=0, the visible light is relatively dark when log(intensity of reflective light)=−19, and the brightness of light varies when log(intensity of reflective light) varies between about 0 and about −19. As shown in FIG. 2 of FIG. 4, when the particle size of the particles is approximately 1 μm, the reflected light is obviously concentrated in one spot (as shown in FIG. 2, the bright white dot). That is, the upper surface **120*a* of the surface protective film 120 has a relatively strong specular reflection property with respect to the ambient light having an incident angle of about 60°, and therefore the gloss is relatively large. If the particle size of the particles is increased to approximately 5 μm or 15 μm, reflective light thereof is more scattered along with increase in the particle size (as shown in FIG. 3 and FIG. 4). That is, the gloss of the upper surface 120*a* of the surface protective film 120 relative to the ambient light having an incident angle of about 60° reduces along with increase in the particle size. Therefore, by means of calculation through simulation using the FDTD method, it can be known that the gloss reduces along with increase in the particle size of all the particles of the surface protective film 120. In another aspect, in FIG. 2 to FIG. 4, influences of a change in the refractive index on the degree of scattering of reflective light is not obvious, when refractive index of the particles is in a range between approximately 1.49 to approximately 1.59, regardless of the particle size of the particles. That is, the change in the refractive index of the first particles 122** in this embodiment does not obviously influence the degree of scattering of the reflective light, thereby reducing the effect of affecting the gloss.

Referring to FIG. 1, in this embodiment, the surface protective film 120 of the polarizer 100 optionally includes a plurality of second particles 124. The second particles 124 have a second particle size, and the second particle size is smaller than the first particle size. In detail, the second particle size of the second particles 124 is less than the first particle size of the first particles 122 and greater than 0 μm, and therefore the second particles 124 can be filled in gaps between the first particles 122, so as to improve the haze of the surface protective film 120 and increase roughness of the upper surface **120*a*, so that reflection of the ambient light becomes more scattered, thereby reducing the gloss. In this embodiment, there is a plurality of sizes for the second particle size of the second particles 124. Preferably, the second particle size of the second particles 124 is less than approximately 10 μm and greater than 0 μm, but the present disclosure is not limited thereto. In addition, in this embodiment, the material of the second particles 124 may include silicon dioxide, poly acrylate, or other suitable materials, and the refractive index of the second particles 124** is in a range between approximately 1.49 and approximately 1.59.

In addition, the present disclosure further provides a method for manufacturing a surface protective film 120, and an example in which the surface protective film 120 is covered by a plurality of first particles 122 and a plurality of second particles 124, but the present disclosure is not limited thereto. First, an uncured organic resin is provided, and is fully mixed with a plurality of first particles 122 and a plurality of second particles 124, a second protective layer 108 is then coated thereon, and subsequently a curing process is performed to cure the organic resin, so as to form a surface protective film 120. It should be noted that the organic resin, the first particles 122, and the second particles 124 are fully mixed, and therefore after the curing process, the first particles 122 and the second particles 124 are disposed in the surface protective film 120. Moreover, some of the first particles 122 or second particles 124 may be relatively close to an upper surface 120*a* of the surface protective film 120 due to a high density of the particles, so that the upper surface 120*a* is rough, therefore improving the degree of ruggedness of the surface of the polarizer 100 (as shown in FIG. 1).

Referring to table 1, table 1 is a comparison table for the haze, the particle size of particles, the percentage of area occupied by the first particles, and the gloss of surface protective films of polarizers of examples E1 to E4 and surface protective films of polarizers of comparative examples E5 to E7. The surface protective films of polarizers of comparative examples E5 to E7 do not include first particles. That is, the particle sizes of particles of the surface protective films of polarizers of comparative examples E5 to E7 are all less than 10 μm, and the haze can be adjusted by adjusting a quantity of particles in the surface protective film. As shown in table 1, in examples E1 to E3 of the present disclosure, the surface protective film 120 has first particles 122 having a particle size being substantially equal to or greater than 10 μm and a relatively high haze, and therefore the gloss of the surface protective film 120 is greater than 0 GU and less than or substantially equal to 5 GU that is less than or substantially equal to the gloss of paper (such as the gloss of paper is approximately 4.1 GU), regardless of degrees of the incident angle of light. Thus, a display device with a gloss substantially similar to paper can be provided, and a change in the gloss at any view angle of a user is relatively small. Moreover, the visible light penetrating degree in examples E1 to E4 of the present disclosure may still enable the user to see texts or patterns displayed on the display device, and the visibility and visual quality of the display device can be maintained. Upon comparison, in comparative examples E5 to E7, the surface protective film 120 does not include first particles 122 having a particle size being substantially equal to or greater than 10 μm, and therefore the gloss of the surface protective film 120 is still a multiple of the gloss of examples E1 to E3 of the present disclosure when the incident angle of light is relatively large (for example, about 85°) although the comparative examples E5 and E6 have a relatively high haze relative to examples E1 to E3 of the present disclosure. Thus, the gloss can be effectively reduced when the surface protective film 120 include first particles 122. Further, as can be seen from table 1, for example, first particles 122 and second particles 124 being mixed in the surface protective film 120, the surface protective film 120 has first particles 122 having a particle size being substantially equal to or greater than 10 μm and less than or substantially equal to 25 μm, and also has second particles 124 having a particle size being greater than 0 μm and less than 10 μm. Second particles 124 having a particle size being substantially equal to or greater than 2 μm and less than 10 μm are used as an example in the present disclosure. In addition, the haze of example E4 of the present disclosure is relatively low, and therefore the degree of reduction in the gloss is relatively small than examples E1 to E3 when the incident angle of light is relatively large (for example, about 85°). However, it should be noted that, in example E4 and comparative example E7, although the haze of example E4 is far lower than the haze of the comparative example E7, the gloss of example E4 at various angles is still lower than the gloss of the comparative example E7 at the respectively angles, because the surface protective film 120 of example E4 of the present disclosure have first particles 122.

TABLE 1

| | Example | Haze | Particle size of overall particles (μm) | Percentage of area occupied by first particles 122 | Gloss (GU) 20° | 60° | 85° |
|---|---|---|---|---|---|---|---|
| Examples of the present disclosure | E1 | 89.0% | 3-25 | 40.2% | 0.1 | 0.8 | 1.1 |
| | E2 | 86.8% | 2-16 | 29.5% | 0.1 | 0.8 | 2.3 |
| | E3 | 85.5% | 2-11 | 15.8% | 0.1 | 1.1 | 3.7 |
| | E4 | 34.0% | 3-25 | <10% | 2.2 | 16 | 17.1 |
| Comparison examples | E5 | 90.7% | 1-5 | 0% | 0.1 | 0.8 | 12.7 |
| | E6 | 91.0% | ≤3 | 0% | 0.1 | 0.7 | 17.0 |
| | E7 | >80.0% | 3-5 | 0% | 2.9 | 19.8 | 44.3 |

Figure 5:
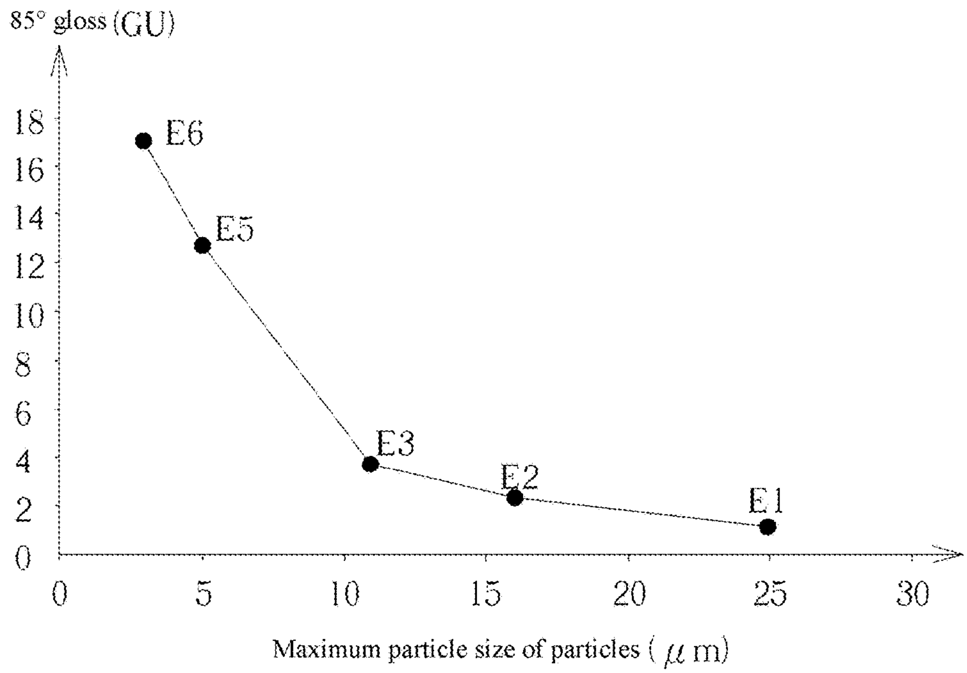
FIG. 5 is a schematic of relationship between a gloss and a maximum particle size of particles on a surface protective film of a polarizer when an incident angle is 85° in one of examples in table 1.
Figure 6:
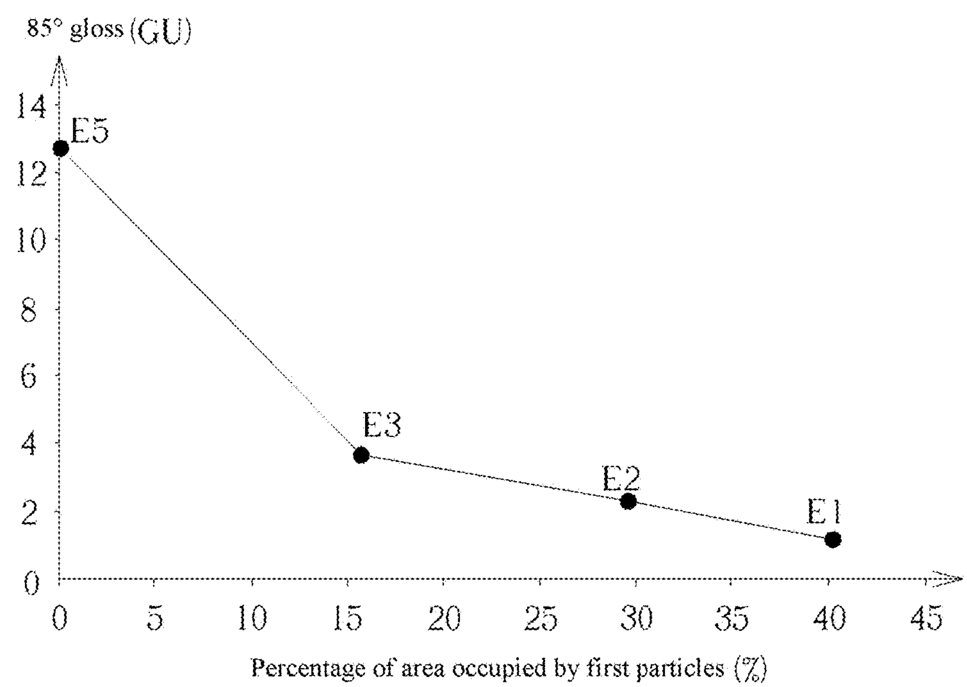
FIG. 6 is a schematic of relationship between a gloss and a percentage of area occupied by first particles on a surface protective film of a polarizer when an incident angle is 85° in one of examples in table 1.

Referring to FIG. 5 and FIG. 6, in combination with table 1, FIG. 5 is a schematic of relationship between a gloss and a maximum particle size of particles on a surface protective film of a polarizer when an incident angle in an example in table 1 is about 85° (referred to as about 85° gloss in the following text and drawings). FIG. 6 is a graph of relationship between a gloss and a percentage of area occupied by first particles on a surface protective film of a polarizer when an incident angle in an example in table 1 is about 85° (referred to as about 85° gloss in the following text and drawings). FIG. 5 is a graph of relationship between 85° gloss and a maximum particle size of examples E1, E2, E3, E4, E5, and E6. FIG. 6 is a graph of relationship between about 85° gloss and a percentage of occupied area of examples E1, E2, E3, and E5. As shown in FIG. 1 and FIG. 5, in comparative examples E5 and E6, the maximum particle size of particles in E5 is greater than the maximum particle size of particles in E6, and therefore the about 85° gloss of E5 is lower than the about 85° gloss of E6. Likewise, in examples E1 to E3 of the present disclosure, the maximum particle sizes of particles are sorted in a descending sequence, namely, E1, E2, and E3, and therefore the about 85° gloss of E1 is lower than the about 85° gloss of E2, and the about 85° gloss of E2 is lower than the about 85° gloss of E3. In another aspect, as shown in table 1 and FIG. 6, in examples E1, E2, E3, and E5, the percentages of area occupied by the first particles 122 are sorted in a descending sequence, namely, E1, E2, and E3. Moreover, example E5 does not have first particles 122, and examples E1, E2, E3, and E5 all have a high haze. Thus, the about 85° gloss of E1 is lower than the about 85° gloss of E2, the about 85° gloss of E2 is lower than the about 85° gloss of E3, and the about 85° gloss of E3 is lower than the about 85° gloss of E5. Therefore, as can be known from FIG. 5 and FIG. 6, the gloss of a large incident angle may be reduced when a maximum particle size of the first particles 122 of the surface protective film 120 of the polarizer 100 increases or the percentage of area occupied by the first particles 122 thereof increases. Therefore, in examples E1, E2, and E3 of the present disclosure, the haze of the surface protective film 120 is substantially equal to or greater than 85% and less than or substantially equal to 95%, and the percentage of area occupied by the first particles 122 on the upper surface 120*a* of the surface protective film 120 is equal to or greater than 15.8%. In a preferable embodiment of the present disclosure, the haze of the surface protective film 120 is substantially equal to or greater than 85% and less than or substantially equal to 95%, and the percentage of area occupied by the first particles 122 on the upper surface 120*a* of the surface protective film 120 is in a range between approximately 15.8% to approximately 78.5%, and 78.5% is the maximum percentage of area that can be occupied by the first particles 122 when the first particles 122 having substantially an identical particle size. In detail, the percentage of area is obtained by an area occupied by the first particles 122 in an area measured by an optical microscope dividing an area measured by the optical microscope, for example, the area measured by the optical microscope being about 220 μm multiplied by about 180 μm, where the magnification is five times. However, persons skilled in the art may select the measured area and the magnification according to actual measurement conditions of the optical microscope.

It can be known from the above that the surface protective film 120 of the polarizer 100 has first particles 122, and therefore has an effect of reducing the gloss regardless of degrees of the incident angle of the ambient light, and the gloss can be further reduced by increasing the haze of the surface protective film 120, the maximum particle size of the particles, and the percentage of area occupied by the first particles 122, so that brightness of ambient reflective light observed by a user at various view angles is reduced, thereby further improving the visual quality of the user in viewing.

Figure 7:
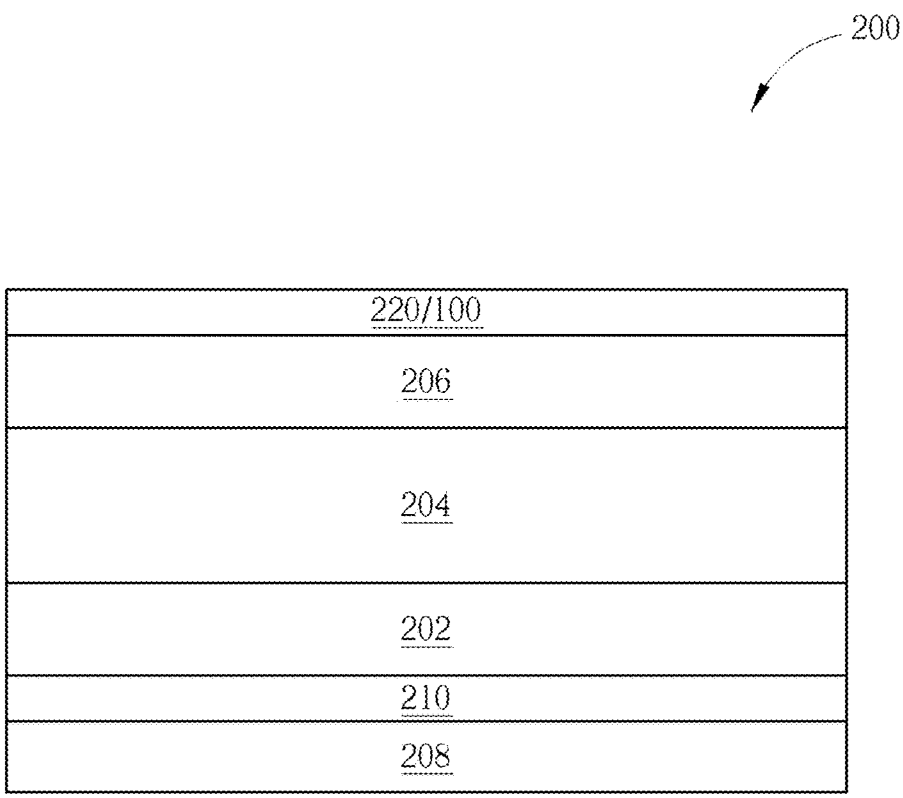
FIG. 7 is a schematic cross-sectional view of a display device according to an example of the present disclosure.

Referring to FIG. 7, FIG. 7 is a schematic cross-sectional view of a display device according to an embodiment of the present disclosure. As shown in FIG. 7, the display device 200 of the present embodiment includes a first substrate 202, a display medium layer 204, a second substrate 206, a lower polarizer sheet 210, and an upper polarizer sheet 220. The following describes the components and relative configuration relationship in sequence. The first substrate 202 may be an array substrate, and therefore components such as an active component, a pixel electrode, and a common electrode can be disposed on the first substrate 202. For example, the first substrate 202 has a plurality of sub-pixels each having at least one active component, at least one pixel electrode, and at least one signal line, the pixel electrode being electrically connected to the active component and the signal line. The signal line includes a scanning line, a data line, or other lines. The second substrate 206 is disposed opposite to the first substrate 202. The display medium layer 204 is disposed between the first substrate 202 and the second substrate 206. The lower polarizer sheet 210 is disposed on the first substrate 202, and optionally may be disposed on an inner surface or an outer surface of the first substrate 202, and the accompanying drawings are provided only for illustrating. The lower polarizer sheet 210 may be a generally film or a wire-grid polarizer. The upper polarizer sheet 220 is disposed on the second substrate 206, and optionally may be disposed on an inner surface or an outer surface of the second substrate 206, and the accompanying drawings are provided only for illustrating. The upper polarizer sheet 220 may is located on the side viewed by a user, the lower polarizer sheet 210 may is located on the side far away from the user, and the upper polarizer sheet 220 is located between the user and the lower polarizer sheet 210. In addition, the display medium layer 204 includes a liquid crystal layer. The liquid crystal layer includes a plurality of liquid crystal molecules. The display medium layer 204 may also include an organic light emitting diode combined with a liquid crystal layer or a quantum dot combined with a liquid crystal layer. The lower polarizer sheet 210 may not be present when the display medium layer 204 is only a light emitting layer (including organic or/and inorganic) or quantum dots. A liquid crystal layer is used as an example for the display medium layer 204 shown in FIG. 7, and a liquid crystal display device is used as an example for the display device 200 shown in FIG. 7, but the present disclosure is not limited thereto. In detail, for example, the lower polarizer sheet 210 is disposed on a first substrate 202 and is located on a side of the first substrate 202 opposite to the display medium layer 204. The upper polarizer sheet 220 is disposed on a second substrate 206 and is located on a side of the second substrate 206 opposite to the display medium layer 204, that is, the first substrate 202 and the second substrate 206 are both located between the lower polarizer sheet 210 and the upper polarizer sheet 220. The upper polarizer sheet 220 includes the structure of the polarizer 100 shown in FIG. 1. Further, the display device 200 of this embodiment further includes a backlight module 208, and the lower polarizer sheet 210 is disposed between the backlight module 208 and the first substrate 202. Therefore, the lower polarizer sheet 210 is closer to the backlight module 208 as compared with the upper polarizer sheet 220. In addition, the display device 200 of this embodiment may further include a color filter layer, a black matrix layer, or other suitable films or structures, so as to provide a better image display effect. In addition, in this embodiment, the first substrate 202 and the second substrate 206 may be transparent substrates such as glass substrates, plastic substrates, quartz substrate, sapphire substrates, or other suitable rigid or flexible substrates. In addition, in a variant embodiment, the display device 200 may be a bifacial liquid crystal display device. That is, the display device 200 may have two lower polarizer sheets 210 and two upper polarizer sheets 220. Likewise, the lower polarizer sheet 210 is closer to the backlight module 208 as compared with the upper polarizer sheet 220, and the upper polarizer sheet 220 includes a structure of the polarizer 100 shown in FIG. 1.

In this embodiment, the upper polarizer sheet 220 of the display device 200 includes the structure of the polarizer 100 shown in FIG. 1, and therefore has an effect of reducing the gloss regardless of degrees of the incident angle of the ambient light when the ambient light is irradiated on the upper polarizer sheet 220 of the display device 200, so that brightness of ambient reflective light observed by a user at various view angles is reduced, thereby further improving the visual quality of the user in viewing.

To sum up, the surface protective film of the polarizer has first particles having a particle size being equal to or greater than 10 μm, and therefore has an effect of reducing the gloss regardless of degrees of the incident angle of the ambient light, and the gloss can be further reduced by increasing the haze of the surface protective film, the maximum particle size of the particles, and the percentage of area occupied by the first particles, so that brightness of ambient reflective light observed by a user at various view angles of is reduced, thereby further improving the visual quality of the user in viewing. In another aspect, the upper polarizer sheet of the display device includes the structure of the polarizer, and therefore has an effect of reducing the gloss regardless of degrees of the incident angle of the ambient light when the ambient light is irradiated on the upper polarizer sheet of the display device, so that brightness of ambient reflective light observed by a user at various view angles is reduced, thereby further improving the visual quality of the user in viewing.

The above described is only preferable embodiments of the present disclosure, and any equivalent alternations and modifications made to the present disclosure within the protection scope thereof should fall within the protection scope of the present disclosure.

What is claimed is:

1. A display device, comprising:

a first substrate having a plurality of sub-pixels, each of the sub-pixels having at least one active component, at least one pixel electrode, and at least one signal line, and the pixel electrode being electrically connected to the active component and the signal line;

a second substrate disposed opposite to the first substrate;

a display medium layer disposed between the first substrate and the second substrate; and an upper polarizer sheet disposed on the second substrate and located at a user side of the display device, wherein the upper polarizer sheet comprises:

an adhesive;

a first protective layer disposed on the adhesive;

a substrate layer disposed on the first protective layer;

a second protective layer disposed on the substrate layer; and a surface protective film disposed on the second protective layer, wherein the surface protective film comprises a plurality of first particles, and each of the first particles has a first particle size, the first particle size being substantially equal to or greater than 10 micrometer (μm);

wherein the surface protective film has an upper surface, and a percentage of area occupied by the first particles on the upper surface of the surface protective film is substantially equal to or greater than 15.8% and less than or equal to 40.2%;

wherein gloss values of the surface protective film at various angles of view are less than or substantially equal to 5 gloss units (GU) and greater than 0 gloss units (GU); and wherein the surface protective film has a haze, and the haze is substantially equal to or greater than 85% and less than or equal to 89%.

2. The display device according to claim 1, further comprising a backlight module, wherein the first substrate is disposed between the backlight module and the upper polarizer sheet.

3. The display device according to claim 1, further comprising a lower polarizer sheet disposed on the first substrate, wherein the display medium layer comprises a liquid crystal layer.

4. The display device according to claim 1, wherein the first particle size is substantially equal to or greater than 10 μm and less than or substantially equal to 25 μm.

5. The display device according to claim 1, wherein the surface protective film further comprises a plurality of second particles, and each of the second particles has a second particle size, the second particle size being greater than 0 micrometer (μm) and smaller than the first particle size.

6. The display device according to claim 5, wherein the second particle size is greater than 0 μm and less than 10 μm.

7. The display device according to claim 5, wherein the first particles and the second particles respectively have the refractive index in a range of about 1.49 to about 1.59.

8. The display device according to claim 1, wherein gloss values of the surface protective film at various angles of view are less than or substantially equal to 4.1 gloss units (GU) and greater than 0 gloss units (GU).

* * * * *